United States Patent [19]
> Ciallella

[11] Patent Number: 4,569,772

[45] Date of Patent: Feb. 11, 1986

[54] STABILIZATION OF POLYETHYLENE TEREPHTHALATE-POLYOXYETHYLENE TEREPHTHALATE SOIL RELEASE PROMOTING POLYMERS

[75] Inventor: Loretta K. Ciallella, Colonia, N.J.

[73] Assignee: Colgate-Palmolive, New York, N.Y.

[21] Appl. No.: 646,982

[22] Filed: Sep. 4, 1984

[51] Int. Cl.$^4$ .............................................. D06M 5/02
[52] U.S. Cl. ...................... 252/8.6; 252/8.9; 252/551; 252/DIG. 2; 525/173
[58] Field of Search ............ 252/8.6, 8.9, 551, DIG. 2; 525/173

[56] References Cited

U.S. PATENT DOCUMENTS

| | | | |
|---|---|---|---|
| 3,557,039 | 1/1971 | McIntyre et al. | 525/437 |
| 3,893,929 | 7/1975 | Basadue | 252/8.6 |
| 3,909,476 | 9/1975 | Mandell, Jr. | 252/8.6 |
| 3,959,230 | 5/1976 | Hays | 252/8.9 |
| 3,962,152 | 6/1976 | Nicol et al. | 252/8.6 |
| 3,993,830 | 11/1976 | Dickson et al. | 252/8.6 |
| 4,116,885 | 9/1978 | Derstadt et al. | 252/551 |
| 4,125,370 | 11/1978 | Nicol | 252/8.9 |

*Primary Examiner*—Paul Lieberman
*Assistant Examiner*—Willie J. Thompson
*Attorney, Agent, or Firm*—Herbert S. Sylvester; Murray M. Grill; Norman Blumenkopf

[57] ABSTRACT

Polyethylene terephthalate-polyoxyethylene terephthalate soil release promoting polymers, which have been found to be subject to loss of soil release promoting properties on storage in contact with alkaline material, such as builder salts for synthetic organic detergents, are stabilized by melting them together with a water soluble polyacrylate and subsequently converting the melt to solid particles which contain the PET-POET polymer and polyacrylate in intimate contact. Preferably the melt is at a temperature above 70° C., such as within the range of 70° to 150° C., the melt is solidified by cooling and the solid product resulting is cryogenically size reduced to desired particle size and flake shape, preferably such as will pass through a No. 10 sieve, U.S. Sieve Series.

12 Claims, No Drawings

STABILIZATION OF POLYETHYLENE TEREPHTHALATE-POLYOXYETHYLENE TEREPHTHALATE SOIL RELEASE PROMOTING POLYMERS

This invention relates to the stabilization of polyethylene terephthalate-polyoxyethylene terephthalate soil release promoting polymers. More particularly, it relates to a process of fusing such a polymer, at elevated temperature, with a polyacrylate, so that the PET-POET polymer and the polyacrylate form a homogeneous melt, and converting such melt to particulate form, in which the PET-POET polymer and the polyacrylate remain in intimate contact. The stabilized PET-POET polymers so made are superior in stability, as shown by superior soil release promoting properties, when stored, even at elevated temperatures, in contact with alkaline materials, such as alkaline builders for detergent compositions, when such polymers are incorporated in such compositions. It has been found that such stability is also superior to that of PET-POET polymers coated with polyacrylate or intimately mixed with polyacrylate in finely divided forms. When the stabilized particulate soil release promoting polymers are incorporated in nonionic detergent-based detergent compositions, soil and stain removing properties of such compositions are improved, compared to compositions of similar formulas wherein the PET-POET polymer and the polyacrylate are present as mixed individual powders.

PET-POET polymers have been described in the patent literature as useful to promote soil release from laundry that had previously been treated with such a polymer by washing with a detergent composition containing it. U.S. Pat. No. 3,962,152 and British Pat. No. 1,088,984 both teach soil releasing effects. It has been found that such polymeric materials can be destabilized by anionic detergents and/or alkaline compounds. Therefore, when detergent compositions are made containing PET-POET polymers such polymers tend to lose their soil release promoting properties on storage if the detergent compositions contain alkaline builder salts, such as sodium carbonate or other alkaline materials, with the most significant losses in such activity being in those compositions which are more strongly alkaline and which are stored at more elevated temperatures for longer periods of time. Accordingly, efforts have been made to stabilize the soil release promoting polymers, so that their desirable properties will not be lost when they are incorporated in built detergent compositions.

Applicant has discovered that when a PET-POET polymer is melted and mixed with a water soluble polyacrylate, such as sodium polyacrylate, preferably of a molecular weight in the range of about 1,000 to 5,000, e.g., about 2,000, in a proportion within the range of about 2:1 to 8:1 (PET-POET polymer to polyacrylate) and the melt is converted to particulate solid form, with the mentioned polymers still being in intimate contact in such form, the soil release properties of the PET-POET polymer are retained despite storage of the described particles in contact with particulate alkaline materials, such as builder salts for synthetic organic detergents, which are often present in built particulate detergent compositions. This discovery was surprising, especially because various other polymeric materials are unsatisfactory for stabilization of the PET-POET polymers. Also, coating of powdered PET-POET polymer with a solution of sodium polyacrylate, followed by drying such coating, does not result in the same desirable stabilization, nor does mixing together of finely divided powders of such polymers. To obtain applicant's results initial fusion together of the polymers is required. Such requirement is surprising because it would have been expected that there would be an interaction between the polymers at elevated temperature or that the elevated temperature would have contributed to the destabilization of the soil release promoting polymer. A further desirable effect noted is the improvement in cleaning of soiled and stained materials of various types during washing with built nonionic detergent compositions containing the particulate stabilized soil release promoting polymer of this invention. Such washing yields noticeably cleaner fabrics, compared to cleaning with detergent compositions containing PET-POET polymers and sodium polyacrylate in powdered form. This result is also surprising because the cleaning effects are not related to soil release promotion, and the soiled fabrics were not previously treated with the soil release promoting agent.

The molecular weight of the PET-POET polymer will usually be in the range of about 15,000 to 50,000, preferably being about 19,000 to 43,000, more preferably being about 19,000 to 25,000, e.g., about 22,000. Such molecular weights are weight average molecular weights, as distinguished from number average molecular weights, which, in the case of the present polymers, are often lower. In the polymers utilized the polyoxyethylene will be of a molecular weight in the range of about 1,000 to 10,000, preferably about 2,500 to 5,000, more preferably 3,000 to 4,000, e.g., 3,400. In such polymers the molar ratio of polyethylene terephthalate to polyoxyethylene terephthalate units (considering

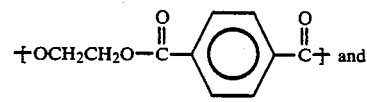

and

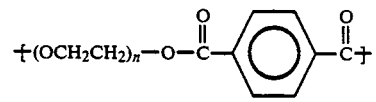

will be within the range of 2: to 6:1, highly preferably 5:2 to 5:1, even more preferably 3:1 to 4:1, e.g., about 3:1. The proportion of ethylene oxide to phthalic moiety in the polymer will be at least 10:1 and often will be 20:1 or more, preferably being with the range of 20:1 to 30:1 and more preferably being about 22:1. Thus, it is seen that the polymer may be considered as being essentially a modified ethylene oxide polymer with the phthalic moiety being only a minor component thereof, whether calculated on a molar or weight basis. It is considered suprising that with such a small proportion of ethylene terephthalate or polyethylene terephthalate in the polymer the polymer is sufficiently similar to the polymer of the polyester fiber substrate (or other polymers to which it is adherent, such as polyamides) as to be retained thereon during the washing, rinsing and drying operations.

Although the described PET-POET polymer is that which is employed normally by applicant, in accordance with the present invention, and which is highly preferred for its desired functions, other PET-POET polymers, such as those described in the previously mentioned U.S. and British patents, may also be employed and will be improved (stabilized) by the method of this invention. However, the soil release promoting properties of such materials may not be as good as those of the preferred polymers.

The polyacrylate employed is a low molecular weight polyacrylate, the molecular weight of which is usually within the range of about 1,000 to 5,000, preferably being in the range of 1,000 to 3,000 and most preferably being between 1,000 and 2,000, e.g., about 2,000. The mean molecular weight will usually be within the range of 1,200 to 2,500, such as 1,300 to 1,700. Although other water soluble polyacrylates may sometimes be substituted in part for the described sodium polyacrylate, including some other alkali metal polyacrylates, e.g., potassium polyacrylate, it is preferred that such substitutions, when permitted, be limited to a minor proportion of the material, and preferably, the polyacrylate employed will be an unsubstituted sodium polyacrylate. Such materials are available from Alco Chemical Corporation, under the name Alcosperse. The sodium polyacrylates are available as clear amber liquids or powders, completely soluble in water, with the solutions being of about 25 to 40% solids contents, e.g., 30%, and with the pH of such solution or of a 30% aqueous solution of a powder being in the range of 7.5 to 9.5. Among these products those preferred are presently sold as Alcosperse 104, 107, 107D, 109 and 149, of which Alcosperse 107D, a 100% solids powder, is highly preferred, although Alcosperse 107, a 30% aqueous solution, may be used instead with little difference in results (provided that it is dried first). Both are sodium polyacrylates with the liquid (107) being of a pH in the 8.5 to 9.5 range and the pH of the powder (107D) being in the 7.0 to 8.0 range, at 30% concentration in water. The powder is preferably anhydrous but may contain a minor proportion of water, normally less than 10%, which is largely removed during the fusion operation.

To practice the process of the invention and to make the stabilized soil release promoting polymer thereof, following normal procedure, the PET-POET polymer is melted by being raised to a temperature above its melting point and preferably to a temperature in the range of 70° to 150° C., to liquefy it, and there is added to it powdered solid sodium polyacrylate, as described. When a uniform melt has been obtained it may be cooled and the solidified mass may be size reduced by any suitable means. Preferably, cryogenic grinding or flaking operations will be employed so that the product will be a finely divided powder or flake which will be readily miscible with other components of a built detergent composition, and will not segregate objectionably from such composition. Cryogenic size reduction, often undertaken at a temperature below 0° C. and sometimes below −50° C., may be effected by grinding or otherwise size reducing in the presence of liquid nitrogen or other cryogenic material. Alternatively, a suitable grinder, such as a hammer mill, a cage mill or a Raymond Imp Mill may be employed, and instead of liquid nitrogen or other liquid cryogenic coolant, solidified carbon dioxide (dry ice) may be mixed with the resins being ground, or other cooling facilities may be utilized to prevent overheating of the material and to maintain it in cold, readily fracturable form. Instead of the mentioned size reduction devices others of equivalent function may be utilized, including the Raymond Ring-Roll Mill, which contains an internal separator and is capable of producing very finely divided resinous materials.

Instead of utilizing cryogenic or low temperature grinding equipment to size reduce the solidified melt of PET-POET and polyacrylate, the melt may be spray cooled to desirably sized beads, which will usually pass through a No. 10 sieve (U.S. Sieve Series) and preferably will pass through a No. 30 sieve.

The product resulting from application of the processes of the present invention may be considered as PET-POET polymer carrying polyacrylate. Because the proportion of the polyacrylate is relatively minor (although its effect is significant) the PET-POET polymer provides a medium for distributing the polyacrylate throughout any detergent composition with which it is mixed. Thus, in addition to the stabilizing effect the polyacrylate has on the PET-POET polymer, the polymer helps to extend the polyacrylate so that it may be more uniformly distributed throughout the detergent composition and thereby more uniformly impart to such composition desirable properties of the polyacrylate, which include promotion of clay soil removal from laundry during washing and inhibition of soil redeposition on the laundry during washing. The "carrying" of the polyacrylate by the stabilized polymer also obviates the need to spray the detergent composition beads or base beads with a solution of polyacrylate to distribute it evenly throughout the detergent composition.

The primary intended use for the stabilized PET-POET polymers is for soil release promotion in detergent compositions. It has been found that laundry, especially laundry in which the fabrics are of polyesters or polyester blends (usually with cotton), more readily release various soils to the wash water during washing with built synthetic organic detergent compositions, especially those based on nonionic detergents, if the soiling of the laundry takes place after it has been washed with such a detergent composition containing the PET-POET polymer. Some of the polymer is held to the laundry during the washing operation, so that it is present thereon when the laundry is subsequently soiled, and its presence promotes the removal of the soil and/or stain during a subsequent washing. It could have been expected that the polyacrylate, in the same particles as the PET-POET polymer would promote dispersion of the polymer and inhibit deposition thereof on the laundry but such is not the case. Instead, the polyacrylate increases the soil release promoting activity of the PET-POET polymer in detergent compositions by inhibiting decomposition or degradation of the polymer when it is subjected to contact with alkaline materials, as in such built detergent compositions in which the builder salt is alkaline (as many of them are).

The detergent compositions to which the stabilized PET-POET polymers of this invention may be added or in which such may be included, to give the detergent composition desirable soil release promoting properties, are built synthetic organic detergent compositions. The synthetic organic detergent will normally be a nonionic detergent, although in some instances anionic detergents may be useful. Anionic detergents usually tend to inactivate the PET-POET polymer but if they are to be employed in small proportions in basically nonionic detergent compositions the use of the present stabilized PET-POET polymer results in compositions having better soil release promoting activities than result when the PET-POET polymer is used without the stabilizing polyacrylate having previously been fused with it.

Of the nonionic detergents it is preferred to employ those which are condensation products of ethylene oxide and/or propylene oxide with each other and with hydroxyl-containing bases, such as higher fatty alcohols, Oxo-type alcohols and nonyl phenol. Most preferably the higher fatty alcohol is employed and is of 10 to 20 carbon atoms, preferably 12 to 15 or 16 carbon atoms, and the nonionic detergent contains from about 3 to 20 or 30 ethylene oxide groups per mole, preferably 6 to 11 or 12. Most preferably the nonionic detergent will be one in which the higher fatty alcohol is of about 12 to 15 or 12 to 14 carbon atoms and which contains from 6 or 7 to 11 moles of ethylene oxide. Among such detergents is Alfonic ®1214-60C, sold by Conoco Division of E. I. DuPont De Nemours, Inc., and Neodols ®23-6.5 and 25-7, available from Shell Chemical Co. Among their especially attractive properties, in addition to good detergency with respect to oily and greasy soil deposits on goods to be washed, and excellent compatibility with the present polymeric release agents, is a comparatively low melting point, which is still appreciably above room temperature, so that they may be sprayed onto base beads as a liquid which solidifies quickly after it has penetrated into the beads.

Various builders and combinations thereof which are effective to complement the washing action of the nonionic synthetic organic detergent(s) and to improve such action include both water soluble and water insoluble builders. Of the water soluble builders, which preferably are employed in mixture, both inorganic and organic builders may be useful. Among the inorganic builders those of preference include: various phosphates, usually polyphosphates, such as the tripolyphosphates and pyrophosphates, more specifically the sodium tripolyphosphates and sodium pyrophosphates, e.g., pentasodium tripolyphosphate, tetrasodium pyrophosphates; sodium carbonate; sodium bicarbonate; and sodium silicate; and mixtures thereof. Instead of a mixture of sodium carbonate or sodium bicarbonate, sodium sesquicarbonate may often be substituted. The sodium silicate, when employed is normally of $Na_2O:SiO_2$ ratio within the range of 1:1.6 to 1:3, preferably 1:2.0 to 1:2.4 or 1:2.8, e.g., 1:2.4.

Of the water soluble inorganic builder salts the phosphates will usually be employed with a lesser proportion of sodium silicate, the carbonates will be employed with bicarbonate, and sometimes with a lesser proportion of sodium silicate, and the silicate will rarely be used alone. Instead of individual polyphosphates being utilized it will sometimes be preferred to employ mixtures of sodium pyrophosphate and sodium tripolyphosphate in proportions within the range of 1:10 to 10:1, preferably 1:5 to 5:1. Of course, it is recognized the changes in phosphate chemical structure may occur during crutching and spray drying so that the final product may differ somewhat from the components charged to the crutcher.

Of the water soluble organic builders, nitrilotriacetic acid salts, e.g., trisodium nitrilotriacetate (NTA), preferably employed as the monohydrate, are preferred. Other nitrilotriacetates, such as disodium nitrilotriacetate, are also useful. The various water soluble builder salts may be utilized in hydrated forms, which are often preferred. Other water soluble builders that are considered to be effective include the inorganic and organic phosphates, borates, e.g., borax, citrates, gluconates, ethylene diamine tetraacetates and iminodiacetates. Preferably the various builders will be in the forms of their alkali metal salts, either the sodium or potassium salts, or mixtures thereof, but sodium salts are normally more preferred. In some instances, as when neutral or slightly acidic detergent compositions are being produced, acid forms of the builders, especially of the organic builders, may be preferable but normally the salts will either be neutral or basic in nature, and usually a 1% aqueous solution of the detergent composition will be of a pH in the range of 9 to 11.5, e.g., 9 to 10.5.

Insoluble builders, generally of the Zeolite A type, may be used advantageously in the compositions of the present invention, and of these, hydrated Zeolites X and Y may be useful too, as may be naturally occurring zeolites and zeolite-like materials and other ion-exchanging insoluble compounds that can act as detergent builders. Of the various Zeolite A products, Zeolite 4A has been found to be preferred. Such materials are well known in the art and methods for their manufacture need not be described here. Usually such compounds will be of the formula

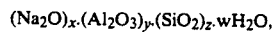
$$(Na_2O)_x \cdot (Al_2O_3)_y \cdot (SiO_2)_z \cdot wH_2O,$$

wherein x is 1, y is from 0.8 to 1.2, preferably about 1, z is from 1.5 to 3.5, preferably 2 to 3 or about 2, and w is from 0 to 9, preferably 2.5 to 6.

The zeolite builder should be a univalent cationexchanging zeolite, i.e., it should be an aluminosilicate of a univalent cation such as sodium, potassium, lithium (when practicable) or other alkali metal or ammonium. Preferably the univalent cation of the zeolite molecular sieve is an alkali metal cation, especially sodium or potassium, and most preferably it is sodium. The zeolites, whether crystalline or amorphous, are capable of reacting sufficiently rapidly with calcium ions in hard water so that, alone or in conjunction with other water softening compounds in the detergent composition, they soften the wash water before adverse reactions of such ions with other components of the synthetic organic detergent composition occur. The zeolites employed may be characterized as having a high exchange capacity for calcium ion, which is normally from about 200 to 400 or more milligram equivalents of calcium carbonate hardness per gram of the aluminosilicate, preferably 250 to 350 mg. eq./g., on an anhydrous zeolite basis. Also they preferably reduce the hardness quickly in wash water, usually within the first 30 seconds to five minutes after being added to the wash water, and lower the hardness to less than a milligram of $CaCO_3$ per liter within such time. The hydrated zeolites will normally be of a moisture content in the range of 5 to 30%, preferably about 15 to 25% and more preferably 17 to 22%, e.g., 20%. The zeolites, as charged to a crutcher mix from which base beads may be made, should be in finely divided state, with the ultimate particle diameters being up to 20 microns, e.g., 0.005 to 20 microns, preferably 0.01 to 8 microns mean particle size, e.g., 3 to 7 microns, if crystalline, and 0.01 to 0.1 micron, e.g., 0.01 to 0.05 micron, if amorphous. Although the ultimate particle sizes are much lower, usually the zeolite particles will be of sizes within the range of No. 100 to 400 sieve, preferably No. 140 to 325 sieve, as charged to the crutcher for the manufacture of the base beads. In the base beads the zeolite(s) will often desirably be accompanied by a suitable builder salt or salts, e.g., sodium carbonate, sodium bicarbonate. Sodium silicate may tend to agglomerate with zeolites so the proportion thereof present in zeolite-built base beads may be limited, as to 2 or 3%, or it may be omitted, especially for carbonate-containing formulations, but sometimes as much as 5 to 10% may be present, as in NTA-built products.

When employing the preferred nonionic detergents in detergent compositions to which the powder or flakes of the present invention are added to impart soil release promoting properties, while phosphate builders are useful, often carbonate builder is preferred. The carbonate, being of the higher alkalinity, has a more detrimental effect on the stability of the PET-POET polymer and accordingly, detergent compositions built with it, and which contain unstabilized PET-POET polymer, can often lose the soil release promoting activity of the polymer after relatively short storage periods. Accordingly, the need for the present invention is greatest for detergent compositions built with carbonate.

In addition to the synthetic organic detergent and builder, detergent compositions will usually also contain a limited proportion of moisture and various adjuvants. Among the adjuvants are fabric softening materials, such as bentonite and other clay fabric softeners, fluorescent brighteners, such as the distilbene brighteners, enzymes, such as proteolytic and amylolytic enzymes, colorants, such as dyes and pigments, and perfumes. In preferred detergents the nonionic detergent (preferably Neodol 23-6.5), is post-sprayed onto base beads (largely builder) and constitutes from 10 to 30%, more preferably 15 to 25% and most preferably about 20% of the final composition. In the final composition the moisture content will usually be from 4 to 14%, preferably 5 to 10%, e.g., about 7 or 8%, the fabric softening clay content will usually be from 1 to 5%, preferably 2 to 4%, e.g., 3%, the enzyme content will normally be from 0.5 to 3%, preferably 1 to 2%, e.g., 1.5%, the polyacrylate content will be from 0.3 to 3%, preferably 0.5 to 2%, e.g., 1% or about 1% and the PET-POET polymer content will be from 2 to 10%, preferably 2 to 6%, and more preferably about 4%. Such compositions may also often have present a relatively small proportion, usually from 0.5 to 3%, of magnesium sulfate, which is added to the crutcher to prevent undesirable setting of the crutcher mix for the base beads. To manufacture the detergent compositions described a crutcher mix is made at a temperature of about 50° to 70° C. and a moisture content of about 30 to 60%, of the clays, builders, magnesium sulfate, colorants and fluorescent brightener, and such is spray dried, in the normal manner, using a conventional production spray tower in which hot combustion products dry atomized droplets of the crutcher mix to the base beads, which normally will be of particle sizes in the range of 10 to 100, U.S. Sieve Series. Onto such dried particles there will be sprayed or dripped molten nonionic detergent, which will be absorbed by the beads and will solidify in them, after which there will be mixed with the built detergent composition resulting the powdered or flaked stabilized PET-POET polymer, of particle sizes less than No. 30, U.S. Sieve Series (preferably 30–100). Enzyme powder, if present, will then be mixed in. Alternatively, in some processes the stabilized polymer may be mixed with the enzyme powder before blending with the rest of the particulate detergent. In some procedures the stabilized polymer may be blended with the base beads before application of the nonionic detergent, and the nonionic detergent may then serve to hold the polymer particles more strongly to the base beads. The various blending operations may be conducted in conventional inclined drum or twin-shell blenders or in other suitable equipment. Perfume, when present, may be applied at any suitable stage but usually is the last added component.

The following examples illustrate but do not limit the invention. Unless otherwise indicated, all parts and percentages are by weight and all temperatures are in °C. in the examples, specification and claims.

EXAMPLE 1

| Component | Percent |
|---|---|
| Zeolite 4A, hydrate (20% moisture content, powder) | 26.0 |
| Sodium carbonate, anhydrous | 18.3 |
| Sodium bicarbonate | 15.7 |
| Bentolite L (fabric softening clay) | 3.0 |
| Fluorescent brightener (stilbene type) | 1.7 |
| Proteolytic enzyme (Maxatase MP) | 1.5 |
| Magnesium sulfate | 1.0 |
| Blue dye | 0.1 |
| Neodol 23-6.5 | 20.0 |
| Alkaril QCF (PET - POET soil release promoting agent) | 4.0 |
| Alcosperse 107D (stabilizer) | 1.0 |
| Perfume | 0.2 |
| Moisture | 7.5 |
| | 100.0 |

In the making of a detergent composition of the above formula, first, an aqueous crutcher mix containing about 50% water and the formula proportions of zeolite, carbonate, bicarbonate, Bentolite L, fluorescent brightener, magnesium sulfate and dye is made at a temperature of about 60° C. and is spray dried in a conventional production spray drying tower of the type employed for spray drying various commercial detergent compositions. The base beads produced, of particle sizes in the No's. 10 to 100 range, U.S. Sieve Series, are then sprayed with liquid state (molten) nonionic detergent, which is at a temperature of about 55° to 60° C., in a suitable mixer, such as a rotating inclined drum or a twin-shell blender. The enzyme powder is then blended with the detergent composition, followed by the stabilized PET-POET polymer (containing sodium polyacrylate). The stabilized polymer had previously been made by melting the formula proportion of Alkaril QCF (desirably anhydrous but it may contain a small proportion of moisture) at a temperature of about 82° C., and mixing into it the formula proportion of Alcosperse 107D (sodium polyacrylate). After such components are thoroughly mixed together so as to form a uniform melt the melt is cooled to solidify it and the resulting mass is cryogenically ground, using any of the grinders previously mentioned, but preferably a hammer or cage mill, so as to be of particle sizes that pass through a No. 30 sieve, U.S. Sieve Series, preferably being of sizes in the range of 30 to 100, U.S. Sieve Series. After the stabilized PET-POET polymer, with the stabilizing polyacrylate present in the particles thereof, is blended with the detergent composition particles the formula proportion of perfume is sprayed onto the blend, while it is kept in motion, as by mixing in an apparatus such as one of those previously mentioned. The product resulting is a satisfactory built nonionic synthetic organic detergent composition of good detergency and of useful soil release promoting characteristics. The soil release promoting polymer therein is stabilized so that after prolonged storage or after storage at elevated temperature for two weeks, the composition exerts appreciably more soil release promoting action than a control composition of the same formula in which the Alkaril QCF is present in the base beads or is applied alone to the detergent composition particles (without polyacrylate being present).

Surprisingly, the soil release promoting action, after aging, of the invented detergent composition of this example is superior to that of a composition of the same formula (4:1 PET-POET:polyacrylate) wherein the QCF and Alcosperse powders are mixed together and then applied to the detergent composition beads, and the invented compositions are superior in soil release promotion to compositions of the formula of the invented composition of this example, wherein the QCF powder is applied to the detergent composition beads and the formula proportion of Alcosperse 107D, in aqueous solution (or Alcosperse 107) is then sprayed onto the detergent composition particles.

To test the soil release promoting action of the product of this invention, compared to a control, wherein the same proportion of PET-POET polymer is present in the detergent composition, detergent compositions of the formula previously given were made, to one of which the stabilized soil release promoting polymer was added and to the other of which the same proportion of such polymer was added, without previously undergoing the stabilizing treatment recited herein. Subsequently, both products were stored for two weeks at 43° C., which approximates elevated temperatures reached in some warehouses. After such storage both the "experimental" and "control" compositions are used to wash clean polyester doubleknit swatches in wash water containing 150 p.p.m. hardness, as calcium carbonate (3:2 calcium:magnesium hardness salt ratio) at a temperature of 49° C. in an automatic washing machine, so as to deposit the soil release promoting polymer on them, with the detergent composition concentration being 0.06% of the wash water, and then the soiled swatches are washed at the same concentration and in the same type of wash water with the same detergent composition. The percentage of soil removal was then calculated and it was found that the experimental formula lost 1.2% of its initial soil removing power (before aging), whereas the composition containing "regular" PET-POET polymer lost 84.5% of its initial soil removing power. Before aging the soil removing powers of both the "experimental" and the "control" composition were essentially the same.

When, instead of the polyacrylate being fused with the soil release promoting polymer, followed by cooling of the mass and size reduction thereof, the PET-POET polymer and polyacrylate powders are mixed and blended with the detergent composition, to produce a product of the same formula as given in this example, after accelerated aging tests it is found that the soil release promoting polymer still deteriorates objectionably and similar results are obtainable when the unstable polymer is mixed with the detergent composition in the proportion given, and the formula proportion of polyacrylate, in aqueous solution, is sprayed onto the polymer and other detergent composition components.

In a cleaning test, known as a multi-stain test, in which cleaning powers of detergent compositions are measured, various stains, including grape juice, blueberry pie, brewed tea, cranberry juice, beef liver blood, chocolate fudge pudding, potting soil, Brandy black clay, liquid make-up, sebum/particulate soil, Bic Black pen ink, barbeque sauce, red Crisco shortening and French dressing are deposited on a variety of fabrics, including Dacron ®/cotton blend, Qiana ®nylon, cotton, and doubleknit Dacron, fabrics likely to be present in a family wash, and the stained and soiled fabrics are washed in test washing machines, with reflectances (indicative of cleaning power) of the various swatches being measured after washing and drying thereof. Using the unaged product of the present invention, as described in this example, compared to a control product, not containing the PET-POET polymer and the polyacrylate, but otherwise the same as that of the formula of this example, it is found that the total of Rd values for the 22 different swatch combinations employed was significantly higher for the experimental than for the control, indicating improved cleaning power. Note that this is not an indication of soil release promotion because the swatches are not washed with the detergent composition to deposit PET-POET polymer thereon before staining.

EXAMPLE 2

A detergent composition including stabilized PET-POET polymer is made by the method described in Example 1 with the exception that the fusion of the PET-POET polymer and polyacrylate takes place at a temperature in the range of 130° C. to 150° C. The product made is of the same formula as in Example 1, but the particles of the stabilized polymer are of particle sizes that pass through a No. 16 sieve (U.S. Sieve Series) instead of a No. 30 sieve. This product is tested in the same manner as described in Example 1 for soil release promoting agent stability and it is found that only 9.6% deterioration occurs after two weeks accelerated aging.

In a variation of this example the stabilized polymer (with polyacrylate present therein) is applied to the base beads before spraying on of the nonionic detergent. The product of such process shows a loss of soil release promoting activity (or a deterioration of the PET-POET polymer) of 9.1%. When the PET-POET polymer and the sodium polyacrylate are applied to the base beads or the detergent composition beads as a mixed powder (not previously fused, cooled and ground) the loss in soil release promoting activity is much higher, being about 30%.

EXAMPLE 3

When the components of the formula of Example 1 are varied, as taught in the specification, when the proportions are changed ±10%, ±20% and ±30%, while still being kept within the ranges recited, detergent compositions of improved stability, compared to controls not containing the invented stabilized PET-POET polymer, are obtained. Similarly, when the manufacturing methods for the production of the stabilized polymer are modified, as previously taught, the products resulting are still of improved stability of the PET-POET polymer and are suitable for use in detergent compositions containing alkaline builder materials, which compositions are expected to be stored for long periods of time or which will be subjected to elevated temperatures during storage.

The invention has been described with respect to various illustrations and embodiments thereof but is not to be limited to these because it is evident that one of skill in the art, with the present specification before him, will be able to utilize substitutes and equivalents without departing from the invention.

What is claimed is:

1. A process for stabilizing soil release promoting polymers of polyethylene terephthalate (PET) and polyoxyethylene terephthalate (POET) against deterioration and loss of soil release promoting properties on storage in contact with alkaline materials, such as alkaline builders for detergent compositions, which comprises heating such a polymer to melt it, mixing with such melt a water soluble alkali metal polyacrylate (APA), and converting the melt to solid particles, which contain mixed PET-POET and APA polymers.

2. A process according to claim 1 wherein the PET-POET polymer is of a molecular weight in the range of about 15,000 to 50,000, the polyoxyethylene of the POET is of a molecular weight in the range of about 1,000 to 10,000, the molar ratio of ethylene terephthalate to POET units is within the range of 2:1 to 6:1, and the alkali metal polyacrylate is sodium polyacrylate of a molecular weight in the range of about 1,000 to 5,000.

3. A process according to claim 2 wherein the temperature to which the polyethylene terephthalate-polyoxyethylene terephthalate polymer is heated is at least 70° C.

4. A process according to claim 3 wherein the temperature at which the PET-POET polymer and the sodium polyacrylate are mixed is within the range of 70° to 150° C.

5. A process according to claim 4 wherein after mixing and melting of the polymers they are cooled to solidify the mix and the resulting solid is size reduced at a low temperature to make particles in which the PET-POET and sodium polyacrylate polymers are in intimate contact.

6. A process according to claim 1 wherein the proportion of PET-POET polymer to alkali metal polyacrylate in the particles is in the range of 2:1 to 8:1 and the particles are in the form of flakes or grinds.

7. A process according to claim 5 wherein the proportion of PET-POET polymer to sodium polyacrylate is about 4:1.

8. A stabilized soil release promoting PET-POET polymer which comprises particles obtained by making a melt of PET-POET polymer and water soluble alkali metal polyacrylate and converting it to particulate solid form.

9. A stable particulate soil release promoting polymer of PET and POET, according to claim 8 wherein the PET-POET polymer is of a molecular weight in the range of 15,000 to 50,000, the polyoxyethylene of the POET is of a molecular weight in the range of 1,000 to 10,000, the molar ratio of ethylene terephthalate to POET units is within the range of 2:1 to 6:1 and the alkali metal polyacrylate is sodium polyacrylate of a molecular weight in the range of about 1,000 to 5,000.

10. A particulate soil release promoting polymer according to claim 9, stabilized against deterioration and loss of soil release promoting properties on storage in contact with alkaline materials, wherein the proportion of PET-POET and sodium polyacrylate polymers is in the range of 2:1 to 8:1.

11. A stabilized particulate soil release promoting polymer according to claim 10 wherein the proportion of PET-POET polymer to sodium polyacrylate polymer is about 4:1.

12. A stabilized particulate soil release promoting polymer according to claim 11, which is of particle size such that it will pass through a No. 10 sieve (U.S. Sieve Series).

* * * * *